United States Patent
Boulton

(10) Patent No.: US 12,515,641 B2
(45) Date of Patent: Jan. 6, 2026

(54) PROCESSING DATA FOR DRIVING AUTOMATION SYSTEM

(71) Applicant: MALIKIE INNOVATIONS LIMITED, Dublin (IE)

(72) Inventor: Adam John Boulton, Wirral (GB)

(73) Assignee: Malikie Innovations Limited (IE)

( * ) Notice: Subject to any disclaimer, the term of this patent is extended or adjusted under 35 U.S.C. 154(b) by 0 days.

(21) Appl. No.: 18/331,250

(22) Filed: Jun. 8, 2023

(65) Prior Publication Data

US 2023/0322212 A1 Oct. 12, 2023

Related U.S. Application Data

(63) Continuation of application No. 16/910,516, filed on Jun. 24, 2020, now Pat. No. 11,708,068.

(30) Foreign Application Priority Data

Jul. 30, 2019 (GB) ...................................... 1910864

(51) Int. Cl.
*B60W 30/00* (2006.01)
*B60K 35/26* (2024.01)
(Continued)

(52) U.S. Cl.
CPC ............. *B60W 30/08* (2013.01); *B60K 35/26* (2024.01); *B60K 35/28* (2024.01); *B60K 35/65* (2024.01);
(Continued)

(58) Field of Classification Search
CPC .... B60W 30/08; B60W 40/09; B60W 60/001; B60W 2030/082; B60W 2420/54;
(Continued)

(56) References Cited

U.S. PATENT DOCUMENTS 9,278,689 B1* 3/2016 Delp ..................... G08G 1/0965
2015/0338227 A1* 11/2015 Kruecken .......... G01C 21/3697
701/410

(Continued)

FOREIGN PATENT DOCUMENTS

DE 102007 030731 A1 1/2009

OTHER PUBLICATIONS

Sammarco, M et al. Crashzam: Sound-based Car Crash Detection, in Proc. 4th Int'l Conf on Vehicle Technology and Intelligent Transport Systems (VEHITS 2018), pp. 27-35 [online][retrieved on Mar. 21, 2023]. Retrieved at URL:https://pdfs.semanticscholar.org/c6da/c8cbcc7b46959e9867740e25f6dc0a439cb5.pdf> (Year: 2018).*

(Continued)

*Primary Examiner* — Peter D Nolan
*Assistant Examiner* — Peter Y Ning
(74) *Attorney, Agent, or Firm* — Botos Churchill IP Law LLP

(57) ABSTRACT

A method of processing data for a driving automation system, the method comprising steps of: obtaining sound data from a microphone of an autonomous vehicle; processing the sound data to obtain a sound characteristic; and updating a context of the autonomous vehicle based on the sound characteristic.

17 Claims, 2 Drawing Sheets

(51) Int. Cl.
*B60K 35/28* (2024.01)
*B60K 35/65* (2024.01)
*B60K 35/85* (2024.01)
*B60K 37/00* (2006.01)
*B60W 30/08* (2012.01)
*B60W 40/09* (2012.01)
*B60W 60/00* (2020.01)
*G06V 20/56* (2022.01)

(52) U.S. Cl.
CPC .............. *B60K 35/85* (2024.01); *B60K 37/00* (2013.01); *B60W 40/09* (2013.01); *B60W 60/001* (2020.02); *G06V 20/588* (2022.01); *B60W 2030/082* (2013.01); *B60W 2420/54* (2013.01)

(58) Field of Classification Search
CPC .............. B60W 60/00; B60W 2420/60; B60W 2554/80; G06V 20/588; B60K 2360/175; B60K 2360/178; B60K 2360/48; B60K 2360/589; B60K 2360/797; B60K 35/28; B60K 35/60; B60K 35/85; B60K 35/00; G01H 5/00; G01S 11/14
See application file for complete search history.

(56) References Cited

U.S. PATENT DOCUMENTS

| | | | |
|---|---|---|---|
| 2016/0217689 A1* | 7/2016 | Young | G08G 1/0965 |
| 2017/0096138 A1* | 4/2017 | Reiff | B60W 10/18 |
| 2017/0213459 A1* | 7/2017 | Ogaz | G08G 1/166 |
| 2017/0297568 A1* | 10/2017 | Kentley | G05D 1/0291 |
| 2017/0309175 A1* | 10/2017 | Kim | G08G 1/0962 |
| 2018/0211528 A1* | 7/2018 | Seifert | H04R 1/406 |
| 2019/0225147 A1* | 7/2019 | Lovison | B60Q 5/006 |
| 2020/0064856 A1* | 2/2020 | Silver | G05D 1/0255 |
| 2021/0200206 A1* | 7/2021 | Diwakar | G05D 1/0055 |
| 2021/0201676 A1* | 7/2021 | Tariq | B60W 30/18163 |
| 2021/0233554 A1* | 7/2021 | Buddhadev | G01S 3/8006 |

OTHER PUBLICATIONS

Sammarco, M et al. Crashzam: Sound-based Car Crash Detection, in Proc. 4th Int'l Conf on Vehicle Technology and Intelligent Transport Systems (VEHITS 2018), pp. 27-35 [online][retrieved on MAar. 21, 2023]. Retrieved at URL:https://pdfs.semanticscholar.org/c6da/c8cbcc7b46959e9867740e25f6dc0a439cb5.pdf> (Year: 2018).*

Extended European Search Report, EP Application No. 20177609.3, issued Nov. 25, 2020.

* cited by examiner

PROCESSING DATA FOR DRIVING AUTOMATION SYSTEM

FIELD OF TECHNOLOGY

The present disclosure relates to processing data for a driving automation system.

BACKGROUND

Autonomous vehicles, of any level of driving autonomy, rely on a range of sensors to assist with the autonomous drive and have a major focus and dependency on being able to "see". However, the sensors have limitations and can be fed with a wide range of data to augment the capabilities and even assist with predictive driving qualities, to further mimic driver anticipation. In one particular instance, cameras and LiDAR are used to identify the presence of other vehicles in the surroundings of an autonomous vehicle. A visualization of the surroundings of the autonomous vehicle can then be shown on the instrument cluster/center console of the vehicle to give feedback to a driver about what the vehicle "sees".

Improvements in the information provided to a driving automation system about other vehicles that are present within the surrounding of an autonomous vehicle are desirable.

SUMMARY

Accordingly, there is provided a method, a computer program and a computing device as detailed in the claims that follow.

BRIEF DESCRIPTION OF THE DRAWINGS

Examples of the present disclosure will now be described with reference to the attached figures, in which.

DETAILED DESCRIPTION

Figure 1:
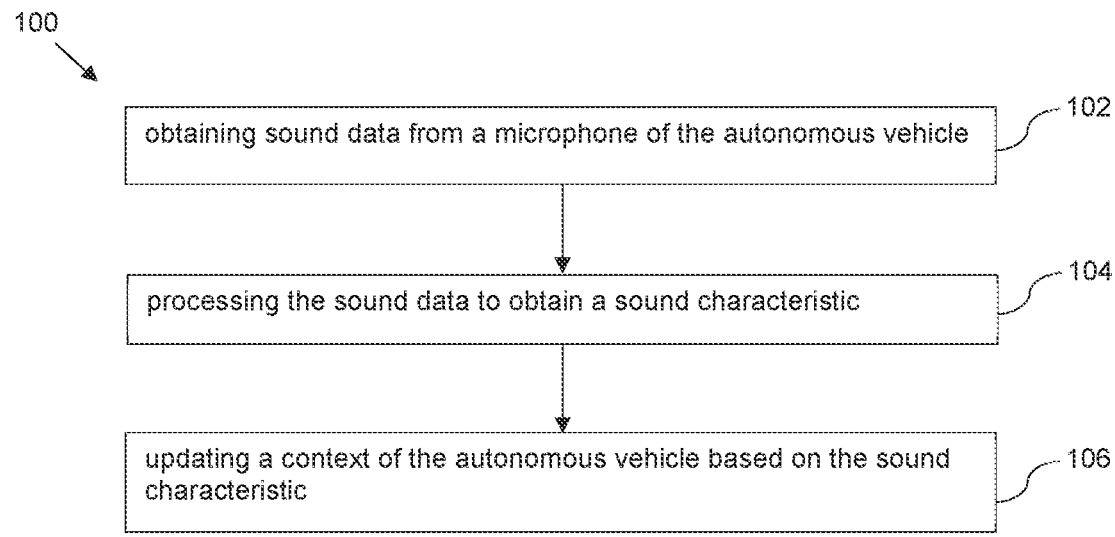
FIG. 1 is a flowchart illustrating a method in accordance with the present disclosure.

The following describes a method of processing data for a driving automation system. The method includes obtaining sound data from a microphone of an autonomous vehicle. The method further includes processing the sound data to obtain a sound characteristic and updating a context of the autonomous vehicle based on the sound characteristic.

The following describes a method by which a self-driving vehicle is provided with an additional sense of being able to "hear" the surrounding environment. This additional form of input provides a sensation that LiDAR and cameras are unable to add, it provides a cross-reference point and it can be used for reinforcement learning.

Due to the nature of how sound travels, frequency analysis may provide an autonomous vehicle with a larger awareness of its surroundings, giving the vehicle capabilities which cannot be achieved through visual based sensors.

Levels of driving automation are defined in SAE International standard J3016 ranging from no driving automation (level 0) to full driving automation (level 5). The present disclosure relates to autonomous vehicles operating at level 3 (conditional driving automation), level 4 (high driving automation) or level 5, as defined in J3016.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

FIG. 1 is a flow diagram showing an example method 100 of processing data for a driving automation system. The method comprises steps as follows. The method comprises obtaining 102 sound data from a microphone of an autonomous vehicle. The method further comprises processing 104 the sound data to obtain a sound characteristic. The method further comprises updating 106 a context of the autonomous vehicle based on the sound characteristic.

In an example, the microphone is an external microphone configured to receive sounds external to the autonomous vehicle. It will be appreciated that the sounds may related to the autonomous vehicle itself or to another vehicle within the surroundings of the autonomous vehicle.

Figure 2:
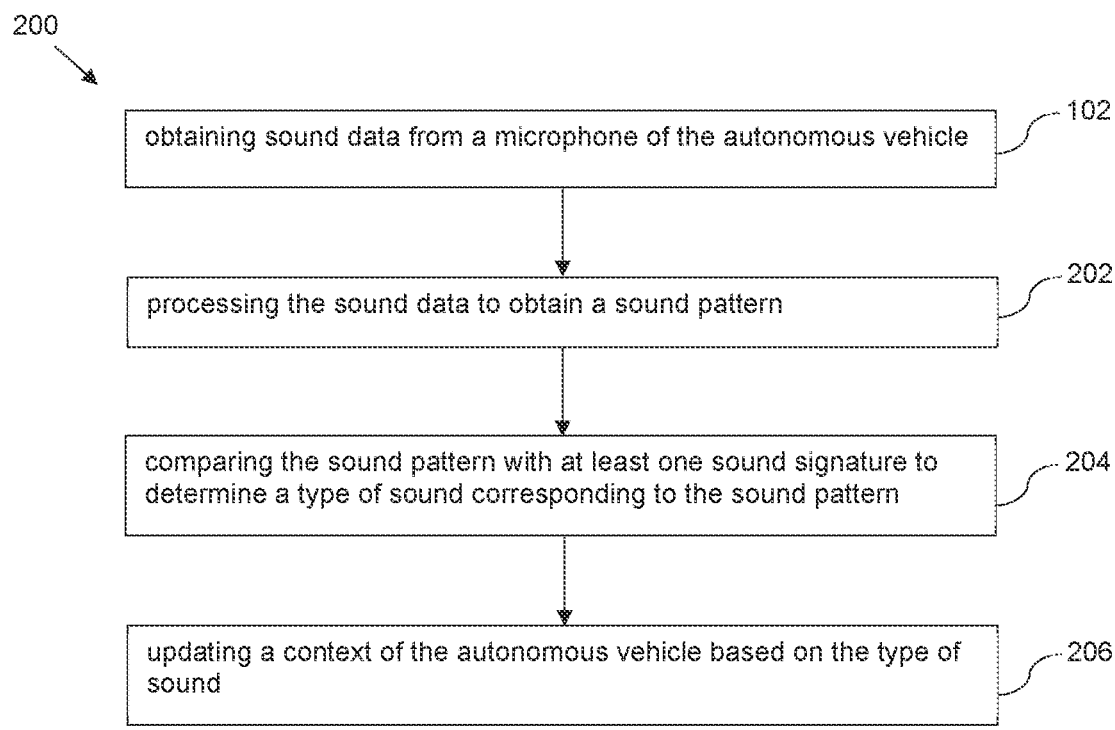
FIG. 2 is a flowchart illustrating steps of a method in accordance with the present disclosure.

FIG. 2 is a flow diagram showing an example method 200 of processing data for a driving automation system. In this example, the sound characteristic is a type of sound. In this example, the step of processing the sound data comprises processing 202 the sound data to obtain a sound pattern and comparing 204 the sound pattern with at least one sound signature to determine a type of sound corresponding to the sound pattern. Each sound signature is indicative of a respective type of sound.

In this example, updating of the context of the autonomous vehicle is based on the type of sound.

The type of sound may, for example, be braking or skidding of a vehicle or a siren of an emergency vehicle, such as an ambulance, a fire truck or a police vehicle.

In an example, the sound data comprises a background sound of an external environment of the autonomous vehicle and the sound pattern. Typically, the sound pattern comprises an anomaly in a generally consistent background sound. The background sound will often comprise road noise, which will be different depending on the type of road surface that the autonomous vehicle is driving on and the speed that the vehicle is moving at.

In an example, the step of processing 202 the sound data to obtain a sound pattern comprises frequency analysis of the sound data within a time window of a pre-set duration. The sound pattern comprises an indication of at least one sound frequency present within the time window. Each sound signature comprises an indication of at least one respective sound frequency present within a respective time window.

In an example, the step of processing 202 the sound data additionally comprises frequency analysis of the sound data to determine a direction and a speed of a source of the sound pattern. For example, where the sound pattern indicates that the type of sound is an emergency vehicle siren, frequency analysis of the sound data within a time window may enable a Doppler shift to be detected, from which a direction and speed of travel of the source of the sound, i.e. the emergency vehicle, may be determined.

Making use of the Doppler effect therefore enables a driving automation system of an autonomous vehicle to detect movement of objects. For example, a vehicle can determine whether an emergency vehicle is heading in its direction or away from it, from the noise of the siren and the result of the Doppler frequency analysis.

In an example, the sound data comprises a background sound of an external environment of the autonomous vehicle and the sound characteristic is a decibel level of the background sound. General decibel detection enables a driving automation system to determine how noisy the external environment is and to modify its behavior accordingly. A general rule is that the louder the environment, the higher the risk due driver distractions.

In an example, the method 100, 200 further comprises providing the updated context to an instrument cluster of the autonomous vehicle and/or a sensor of the autonomous vehicle.

In an example, the method 100, 200 further comprises modifying a behavior of the driving automation system responsive to updating the context of the autonomous vehicle.

In an example, the method 100, 200 further comprises generating a control signal comprising instructions configured to cause the driving automation system to change at least one state of the autonomous vehicle. States of the autonomous vehicle include its road position, its lane position, its speed, its direction of travel and a volume of a sound system of the autonomous vehicle.

For example, a control signal may be generated in response to obtaining a sound pattern indicative of an emergency vehicle siren and Doppler frequency analysis indicating that the emergency vehicle is travelling towards the autonomous vehicle. The control signal in an example of a level 4 or 5 autonomous vehicle might comprise instructions configured to cause the driving automation system to change the road position and speed of the autonomous vehicle, to make room on the road for the emergency vehicle to pass by. In a level 3 autonomous vehicle the control signal might comprise instructions configured to cause the driving automation system to turn down the volume of the sound system so that the driver can hear the emergency vehicle siren or alert the driver to the presence of an emergency vehicle nearby.

In an example, the method 100, 200 further comprises transmitting an emergency call signal from the autonomous vehicle responsive to a sound characteristic indicative of a vehicle collision. The sound data may relate to the autonomous vehicle itself or to a vehicle within its surroundings, so an emergency call signal may be transmitted to indicate that the autonomous vehicle has been involved in a collision or that a vehicle nearby has been involved in a collision. The emergency call signal may comprise an indication of a location of the autonomous vehicle, such as GPS coordinates.

Once the sound is detected, it arms the driving automation system of an autonomous vehicle with the ability to make additional decisions that it would not have had access to. Due to the nature of how sound travels, frequency analysis will provide a vehicle with a greater awareness of its surroundings, capabilities which cannot be achieved through visual based sensors. Sounds may also be detected at distances where visual data is not available via cameras or LiDAR, giving earlier warning of a potential collision ahead or of the presence or approach of an emergency vehicle. The methods described may therefore enable a driving automation system to adjust its decision making earlier than when relying simply on visual data, which may reduce driving risk and enable safer performance of driving maneuvers.

The methods described may enable an instrument cluster of an autonomous vehicle to present a more accurate representation of what the autonomous vehicle "sees" because of the detailed information about other vehicles on the road. This may also bring more confidence to the end user that the vehicle is assessing the surroundings correctly. This is important as it is factors like this which are relied upon to help technology adoption.

By detecting specific sound patterns or specific frequency analysis patterns, a driving automation system can automatically begin to determine additional context for an autonomous vehicle. For example, when a vehicle brakes, frequencies in the range from several Hz to 16 Khz will be heard within a time window having a duration of around 5s. See for example the discussion of braking noise reported in Dihua Guan "*Brake Vibration and Noise—A Review and Discussion*", Proc. International Congress on Acoustics, August 2010, pp 23-27. A sound pattern including these frequencies within a $5s$ time window is therefore indicative of vehicle braking.

The frequency analysis can inform a vehicle about potential disasters, as the frequency can be classified into how hard a vehicle is braking. Another example would make use of the doppler effect, whereby a vehicle would be able to detect movements of objects. For example, a vehicle can determine if an emergency vehicle is heading in its direction, due to the noise of the siren and the result of the doppler effect. There have been incidents whereby a driver has their music on too loud and therefore isn't aware. However, as a vehicle can sense this it can take additional measures to draw the attention to the driver, such as lowering the music volume.

Furthermore, a whole range of noise based/frequency detection can be used to determine all kinds of situations or states. The frequency analysis of a braking system, followed by the sounds of a collision would mean a vehicle can automatically report details of an incident even if it hasn't been involved directly in the collision in itself. For example, a vehicle may have avoided a collision or just driven past as the collision happened as it was able to "hear" the event. Automatic triggers can be setup to report this incident to authorities. The GPS locations would be automatically included. All of this data could later assist other parties such as investigators.

Corresponding examples apply equally to the computer program and computing devices described below.

In an example, a computer program is provided which when executed by at least one processor is configured to implement that steps of the above described methods.

Figure 3:
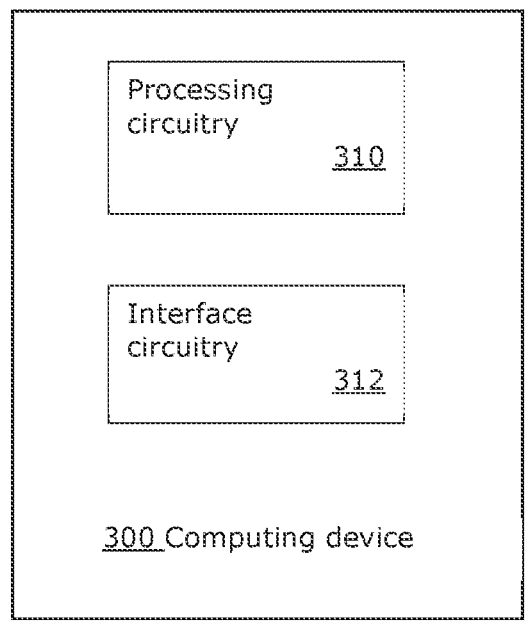
FIGS. 3 and 4 are block diagrams of computing devices in accordance with the present disclosure.

Steps of the above described methods may be implemented by a computing device, which may form part of a driving automation system of an autonomous vehicle. A block diagram of one example of a computing device 300 is shown in FIG. 3. The computing device 300 comprises processing circuitry 310 and interface circuitry 312.

The processing circuitry 310 is configured to obtain sound data from a microphone of an autonomous vehicle. The processing circuitry 310 is configured to process the sound data to obtain a sound characteristic. The processing circuitry 310 is configured to update a context of the autonomous vehicle based on the sound characteristic.

In another example, the sound characteristic is a type of sound. The processing circuitry 310 is configured to process the sound data to obtain a sound pattern. The processing circuitry 310 is configured to compare the sound pattern with at least one sound signature to determine a type of sound corresponding to the sound pattern. Each sound signature is indicative of a respective type of sound.

In an example, the processing circuitry 310 is configured to update the context of the autonomous vehicle is based on the type of sound.

In an example, the sound data comprises a background sound of an external environment of the autonomous vehicle and the sound pattern. Typically, the sound pattern comprises an anomaly in a generally consistent background sound. The background sound will often comprise road noise, which will be different depending on the type of road surface that the autonomous vehicle is driving on and the speed that the vehicle is moving at.

In an example, the processing circuitry 310 is configured to frequency analyze the sound data within a time window of a pre-set duration to obtain the sound pattern. The sound pattern comprises an indication of at least one sound frequency present within the time window. Each sound signature comprises an indication of at least one respective sound frequency present within a respective time window.

In an example, the processing circuitry 310 is configured to frequency analyze the sound data to determine a direction and a speed of a source of the sound pattern. For example, where the sound pattern indicates that the type of sound is an emergency vehicle siren, frequency analysis of the sound data within a time window may enable a Doppler shift to be detected, from which a direction and speed of travel of the source of the sound, i.e. the emergency vehicle, may be determined.

In an example, the sound data comprises a background sound of an external environment of the autonomous vehicle and the sound characteristic is a decibel level of the background sound.

In an example, the processing circuitry 310 is configured to provide the updated context to an instrument cluster of the autonomous vehicle and/or a sensor of the autonomous vehicle.

In an example, the processing circuitry 310 is configured to modify a behavior of the driving automation system responsive to updating the context of the autonomous vehicle.

In an example, the processing circuitry 310 is configured to generate a control signal comprising instructions configured to cause the driving automation system to change at least one state of the autonomous vehicle.

In an example, the processing circuitry 310 is configured to transmit an emergency call signal from the autonomous vehicle responsive to a sound characteristic indicative of a vehicle collision. The sound data may relate to the autonomous vehicle itself or to a vehicle within its surroundings, so an emergency call signal may be transmitted to indicate that the autonomous vehicle has been involved in a collision or that a vehicle nearby has been involved in a collision. The emergency call signal may comprise an indication of a location of the autonomous vehicle, such as GPS coordinates.

Figure 4:
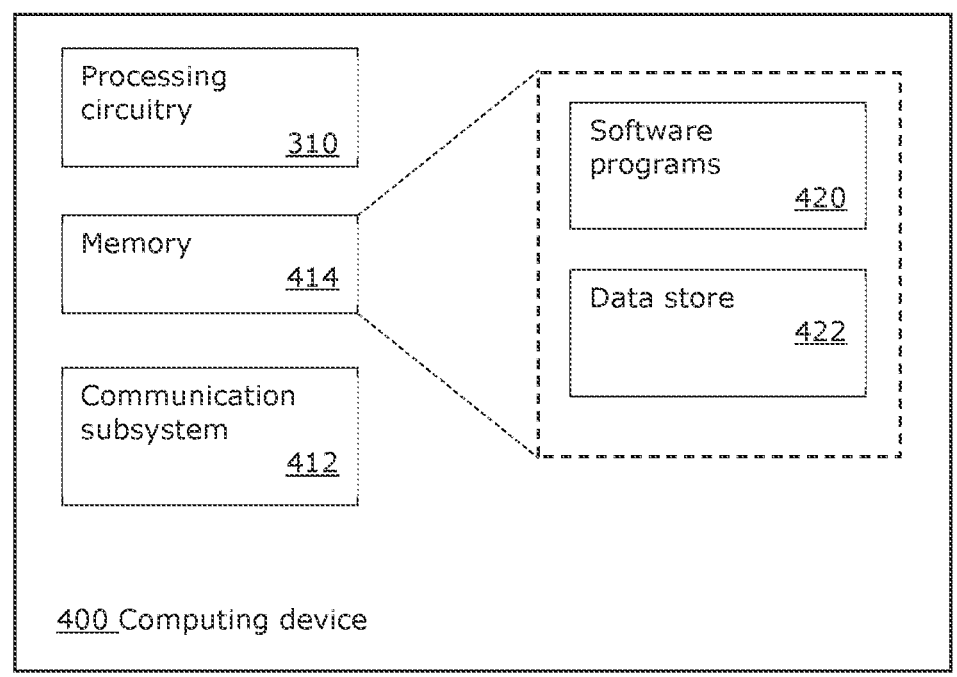

A block diagram of another example of a computing device 600 is shown in FIG. 4. The computing device 400 comprises processing circuitry 310, as described above, interface circuitry in the form of a communication subsystem 412 and memory 414.

In this example, communication functions are performed through the communication subsystem 412. The processing circuitry 310 interacts with the communication subsystem and other components, such as the memory 414 and a microphone of the autonomous vehicle. The memory stores software programs 420 and a data store 422, which may include sound signatures.

The scope of the claims should not be limited by the preferred embodiments set forth in the examples but should be given the broadest interpretation consistent with the description as a whole.

The invention claimed is:

1. A method comprising:
by a processing circuitry of a driving automation system configured to operate an autonomous vehicle:
obtaining, by the processing circuitry, external sound data of sounds external to the autonomous vehicle received from a microphone of the autonomous vehicle comprising an interior and an exterior, wherein the microphone is configured on the autonomous vehicle to receive sounds external to the autonomous vehicle;
processing, by the processing circuitry, the external sound data to obtain a type of sound, wherein the processing comprises:
updating a context of the autonomous vehicle based on the type of sound;
in response to updating the context, generating a control signal to modify a behavior of the driving automation system, the control signal comprising instructions to cause the driving automation system to change at least one state of the autonomous vehicle, wherein the change to the at least one state of the autonomous vehicle comprises at least one of: a change in road position, a change in lane position, a change in speed, a change in direction, or a reduction in volume of a sound system of the autonomous vehicle;
in response to the changed state, while operating the autonomous vehicle, performing frequency analysis on the external sound data to obtain a sound pattern;
comparing the sound pattern with at least one sound signature stored in a memory of the driving automation system to determine the type of sound; and
upon determining that the type of sound comprises a braking sound followed by a collision sound, transmitting an emergency call signal, the emergency call signal comprising a location of the autonomous vehicle.

2. The method of claim 1, wherein each of the at least one sound signature is indicative of a respective type of sound.

3. The method of claim 1, wherein the external sound data comprises a background sound of an external environment of the autonomous vehicle and the sound pattern, and wherein the sound pattern comprises an anomaly in the background sound.

4. The method of claim 1, wherein the frequency analysis is performed on the external sound data over a time window of predefined duration.

5. The method of claim 4, wherein the predefined duration is five seconds.

6. The method of claim 1, wherein the frequency analysis comprises detecting a Doppler shift in the sound pattern, and determining a speed and a direction of a source of the sound pattern from the Doppler shift.

7. A non-transitory computer readable medium having stored thereon executable code for execution by a processing circuitry of a driving automation system configured to operate an autonomous vehicle, the executable code comprising instructions for:
obtaining external sound data of sounds external to the autonomous vehicle received from a microphone of the autonomous vehicle comprising an interior and an exterior, wherein the microphone is configured on the autonomous to receive sounds external to the autonomous vehicle;
processing the external sound data to obtain a type of sound, wherein the processing comprises:
updating a context of the autonomous vehicle based on the type of sound;
in response to updating the context, generating a control signal to modify a behavior of the driving automation system of the autonomous vehicle, the control signal comprising instructions to cause the driving automation system to change at least one state of the autonomous vehicle, wherein the change to the at least one state of the autonomous vehicle comprises at least one of: a change in road position, a change in lane position, a change in speed, a change in direction, or a reduction in volume of a sound system of the autonomous vehicle;
in response to the changed state, while operating the autonomous vehicle, performing frequency analysis on the external sound data to obtain a sound pattern;
comparing the sound pattern with at least one sound signature stored in a memory of the driving automation system to determine the type of sound; and
upon determining that the type of sound comprises a braking sound followed by a collision sound, transmitting an emergency call signal, the emergency call signal comprising a location of the autonomous vehicle.

8. The non-transitory computer readable medium of claim 7, wherein each of the at least one sound signature is indicative of a respective type of sound.

9. The non-transitory computer readable medium of claim 7, wherein the external sound data comprises a background sound of an external environment of the autonomous vehicle and the sound pattern, and wherein the sound pattern comprises an anomaly in the background sound.

10. The non-transitory computer readable medium of claim 7, wherein the frequency analysis is performed on the external sound data over a time window of predefined duration.

11. The non-transitory computer readable medium of claim 10, wherein the predefined duration is five seconds.

12. The non-transitory computer readable medium of claim 7, wherein the frequency analysis comprises detecting a Doppler shift in the sound pattern, and determining a speed and a direction of a source of the sound pattern from the Doppler shift.

13. A driving automation system configured to operate an autonomous vehicle comprising:
interface circuitry; and
processing circuitry configured to:
obtain external sound data of sounds external to the autonomous vehicle received from a microphone of an autonomous vehicle comprising an interior and an exterior, wherein the microphone is configured on the autonomous to receive sounds external to the autonomous vehicle;
process the external sound data to obtain a type of sound, wherein the processing comprises:
updating a context of the autonomous vehicle based on the type of sound;
in response to updating the context, generating a control signal comprising instructions to cause a driving automation system of the autonomous vehicle to change at least one state of the autonomous vehicle, wherein the change to the at least one state of the autonomous vehicle comprises at least one of: a change in road position, a change in lane position, a change in speed, a change in direction, or a reduction in volume of a sound system of the autonomous vehicle;
in response to the changed state, while operating of the autonomous vehicle, performing frequency analysis on the sound data to obtain a sound pattern;
comparing the sound pattern with at least one sound signature stored in a memory of the driving automation system to determine the type of sound; and
upon determining that the type of sound comprises a braking sound followed by a collision sound, transmitting an emergency call signal, the emergency call signal comprising a location of the autonomous vehicle.

14. The computing device of claim 13, wherein each of the at least one sound signature is indicative of a respective type of sound.

15. The computing device of claim 13, wherein the external sound data comprises a background sound of an external environment of the autonomous vehicle and the sound pattern, and wherein the sound pattern comprises an anomaly in the background sound.

16. The computing device of claim 13, wherein the frequency analysis is performed on the external sound data over a time window of predefined duration.

17. The computing device of claim 13, wherein the frequency analysis comprises detecting a Doppler shift in the sound pattern, and determining a speed and a direction of a source of the sound pattern from the Doppler shift.

* * * * *